(12) United States Patent
Petersen et al.

(10) Patent No.: US 8,719,394 B2
(45) Date of Patent: May 6, 2014

(54) METHOD AND ARRANGEMENT FOR A MODIFICATION OF NETWORK MANAGEMENT SCHEMA

(75) Inventors: Robert Petersen, Linköping (SE); John Power, Kilmacthomas (IE); Edwin Tse, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 527 days.

(21) Appl. No.: 13/000,967

(22) PCT Filed: Jun. 27, 2008

(86) PCT No.: PCT/SE2008/050793
§ 371 (c)(1),
(2), (4) Date: Dec. 22, 2010

(87) PCT Pub. No.: WO2009/157834
PCT Pub. Date: Dec. 30, 2009

(65) Prior Publication Data
US 2011/0113132 A1 May 12, 2011

(51) Int. Cl.
*G06F 15/173* (2006.01)

(52) U.S. Cl.
USPC .......................... 709/223; 709/224; 709/226

(58) Field of Classification Search
USPC ......................................... 709/223, 224, 226
See application file for complete search history.

(56) References Cited

U.S. PATENT DOCUMENTS

| 6,292,829 | B1 | 9/2001 | Huang et al. | |
|---|---|---|---|---|
| 6,393,386 | B1 * | 5/2002 | Zager et al. | 703/25 |
| 6,760,733 | B1 | 7/2004 | Komine et al. | |
| 2003/0112275 | A1 | 6/2003 | Proulx et al. | |
| 2005/0080886 | A1 * | 4/2005 | Croy et al. | 709/223 |
| 2005/0097161 | A1 * | 5/2005 | Chiou et al. | 709/200 |
| 2005/0198247 | A1 * | 9/2005 | Perry et al. | 709/223 |
| 2005/0278692 | A1 | 12/2005 | Sridhar et al. | |
| 2005/0278708 | A1 | 12/2005 | Zhao et al. | |
| 2008/0040466 | A1 * | 2/2008 | Markel et al. | 709/223 |

FOREIGN PATENT DOCUMENTS

| CN | 101145969 A | 3/2008 |
|---|---|---|
| EP | 0 835 034 A2 | 4/1998 |
| EP | 0 863 645 A2 | 9/1998 |
| JP | H10-247907 | 9/1998 |
| JP | 2000-090027 | 3/2000 |
| WO | WO 2007/054007 A1 | 5/2007 |

OTHER PUBLICATIONS

European Search Report Corresponding to Application No. 08767259.8; Dated Aug. 26, 2011; 3 pages.

(Continued)

*Primary Examiner* — Nicholas Taylor
(74) *Attorney, Agent, or Firm* — Myers Bigel Sibley & Sajovec, P.A.

(57) ABSTRACT

The present invention relates to a method and an arrangement in a communication system in which a network management architecture comprises modules representing a virtual reality of network nodes (24) and network links under management. Organization of said modules and information contained in said modules are based on a pre-determined network management schema, whereby said network nodes (24) and said network links are managed by accessing and manipulating said modules. The network management schema is modified by reducing the amount of information in said modules. Then, the modified network management schema is used for managing said communication network system and thereby facilitating communication network system management.

18 Claims, 5 Drawing Sheets

(56) References Cited

OTHER PUBLICATIONS

International Search Report corresponding to PCT Application No. PCT/SE2008/050793, Date of Mailing: Mar. 11, 2009.

Japanese correspondence from associate corresponding to Japanese Patent Application No. 2011-516204; Dated Dec. 7, 2012; 4 Pages.
International Preliminary Report on Patentability corresponding to International Application No. PCT/SE2008/050793; Date of Mailing Jan. 13, 2011; 7 pages.

* cited by examiner

METHOD AND ARRANGEMENT FOR A MODIFICATION OF NETWORK MANAGEMENT SCHEMA

CROSS REFERENCE TO RELATED APPLICATION

This application is a 35 U.S.C. §371 national stage application of PCT International Application No. PCT/SE2008/050793, filed on 27 Jun. 2008, the disclosure and content of which is incorporated by reference herein in its entirety. The above-referenced PCT International Application was published in the English language as International Publication No. WO 2009/157834 A1 on 30 Dec. 2009.

TECHNICAL FIELD

The present invention relates to a method and an arrangement in a communication network system and, more particular to an arrangement allowing for facilitating communication network system management as well as a method for such facilitation.

BACKGROUND

A network consists of nodes and links. A large network consists of millions of such nodes and links for the purpose of transporting information among and provisioning of services to network users/subscribers. To satisfy such requirement, the network needs to be managed such that all nodes and links perform their functions as designed and planned.

In a network, the nodes (e.g. Network Element-1 (NE-1), Network Element-A (NE-A) of FIG. 2) may be packet data switches (physical nodes) or software processes (applications) that perform a function. The links (e.g. NEs of FIG. 2) may be microwave links, submarine cables or simply representation of logical connections among nodes. In a cellular network, the nodes may be radio base stations, handsets etc and the links may be radio links, logical connections of Virtual Private Networks (VPNs), etc.

Further in a network, there are nodes that are not responsible for transporting information or provisioning of service for network user/subscribers. These nodes (e.g. Network Manager (NM) and Domain Manager (DM) of FIG. 2) manage the network. They install, configure and supervise the nodes and links. They monitor the network and if the network performance falls below some planned threshold, the network managers then initiate a recovery plan involving, for example, reconfigure the nodes, reconfigure user call routes, deactivate faulty nodes and activate backup nodes etc.

The network management architecture (i.e. organization of the NMs, DMs and NEs are subject of various international standardization bodies and organizations such as ITU-T, 3GPP, 3GPP2 and IETF. All these network management architectures share one basic principle in that the (real) nodes and (real) links are represented by software modules. The collection of the software modules is called Management Information Base (MIB) and is stored and maintained in DMs. Each software module, representing the actual node or link, is called Managed Object Instances (MOIs). The collection of MOIs (i.e. the MID) is a virtual reality of the real nodes and links under management. Applications running in NMs and/or DMs would then manage (supervise and control) the real nodes and links by accessing and manipulating the MOIs.

The organization of the MOIs and the information contained in each MOI are based on a schema. Various international standard bodies publish these so-called schema or network resource model or object model.

In prior art, the MIB, which is a collection of software objects, called MOI, representing managed network resources, managed by DM (see MIB of DM-1 of FIG. 2) is based on the definition of a defined schema. This schema (or schema definition) cannot change at run time. Or put in another way, the MIB is a collection of MOIs that are instantiated (created) based on the definition of a schema. Such kind of MIB is large. When compared to smaller MIB, large MIB is more difficult to maintain in that:

It takes more time to synchronize the information hold in the MIB with real network status It needs more processing power to satisfy MIB data retrieval, MIB data modification and MIB information search requests, from MIB users It contains info that some users do not want and this necessitates these users to apply filter to information retrieved from the MIB. Filter processing takes time.

A schema is the data definition of a Managed Information Base (MIB). This definition is for all NEs classes and their relations. The definitions has to support all operational contexts and users (field engineer, network planners, head office operational staff, etc). Prior art schema cannot change at run time. As a consequence, the MIB which is an instantiation of all NEs of the managed network based on the schema definition would be large because it supports twenty-four hours availability seven days a week:

for all kinds of network management data to satisfy all kinds of users; and, for the entire network.

SUMMARY

Accordingly, one objective with the present invention is to provide an improved method and arrangement for facilitating communication network system management in which a network management architecture comprises modules representing a virtual reality of network nodes and network links under management. Organization of said modules and information contained in said modules are based on a pre-determined network management schema, whereby said network nodes and said network links are managed by accessing and manipulating said modules According to a first aspect of the present invention this objective is achieved through a method as defined in the characterising portion of claim 1, which specifies that communication network system management is facilitated by a method which performs the steps of modifying said network management schema by reducing the amount of information in said modules and, using said modified network management schema for managing said communication network system.

According to a second aspect of the present invention this objective is achieved through an arrangement as defined in the characterising portion of claim 9, which specifies that communication network system management is facilitated by an arrangement comprising an interface for modifying said network management schema by reducing the amount of information in said modules and, a domain manager for using said modified network management schema for managing said communication network system.

Further embodiments are listed in the dependent claims.

Thanks to the provision of a method and arrangement, which provides a mechanism for modifying the schema at run time, the size of the MIB, visible to Managers, will be smaller and thus facilitating communication network system management.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
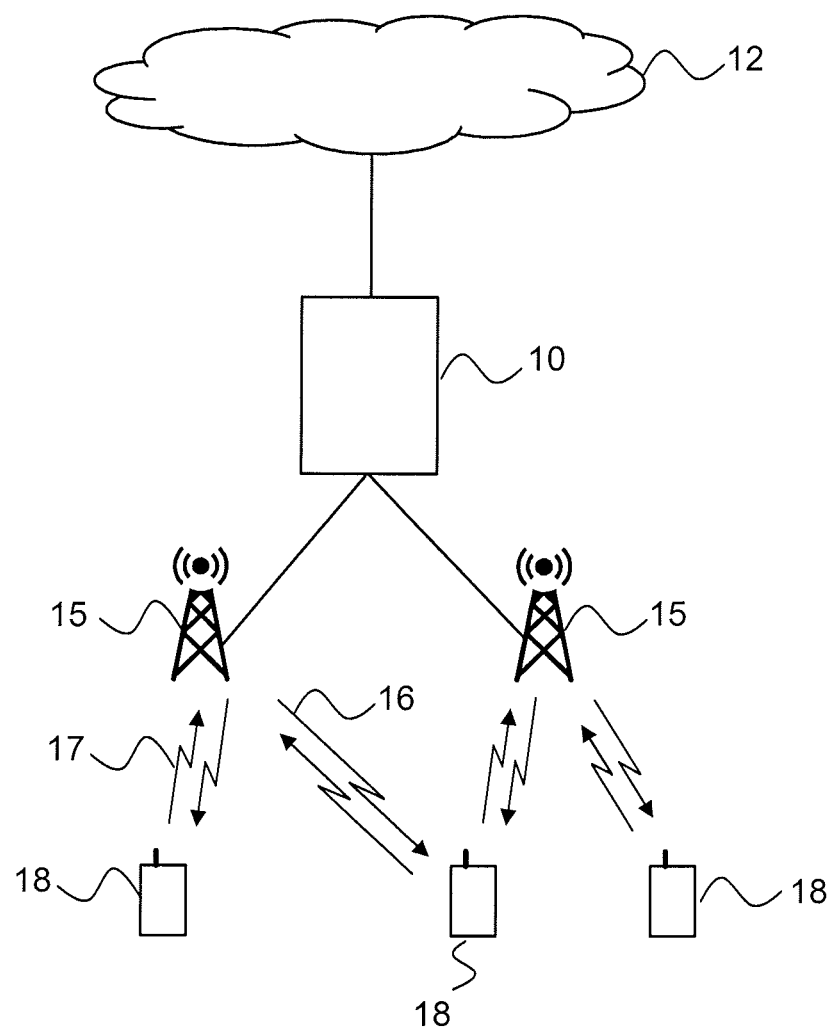
FIG. 1 shows an exemplary communication network architecture.

FIG. 1 depicts a communication network system including a Radio Access Network (RAN), such as the UMTS Terrestrial Radio Access Network (UTRAN) architecture, comprising at least one Radio Base Station (RBS) (or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits to each user equipment 18 at respective power level. On the uplink channel 17, the user equipments 18 transmit data to the RBS 15 at respective power level.

According to a preferred embodiment of the present invention, the communication network system is herein described as a WCDMA communication system. The skilled person, however, realizes that the inventive method and arrangement works very well on other communications systems using network managements as well.

Figure 2:
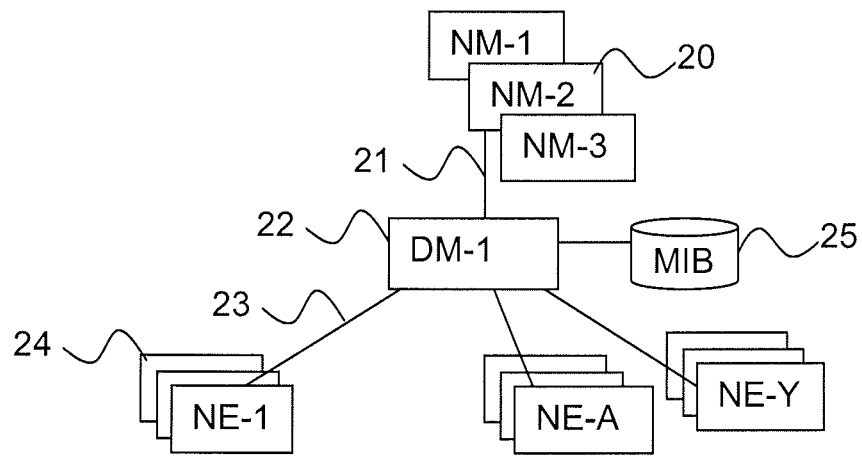
FIG. 2 shows a context diagram according to the present invention.

The communication system further comprises a network management architecture, shown in FIG. 2, comprising nodes responsible of managing the network. These nodes install, configure and supervise the nodes and links of the communication system, as described earlier in the background section.

As can be seen in FIG. 2, the network management architecture comprises network elements (NEs) 24 which are nodes (network resources) in the communication network system, such as the RNC 10 and the radio base stations 15 shown in FIG. 1. The NEs 24 are managed via an interface 23 by a domain manager (DM-1) 22, which maintains a managed information base (MIB) 25 that is a collection of software objects called managed object instances (MOIs), each of which is a representation of the managed network resources 24 such as NE-1, NE-Y. For clarity reasons only one DM is shown in FIG. 2, but the skilled person realizes that the architecture may comprise more than one DM. The MIB users, the NMs 20 are represented by NM-1, NM-2 and NM-3. The MIB 25, or more precisely, the software objects of the MIB 25 are accessible by NMs 20 via the interface-21 in FIG. 2.

The organization of the MOIs and the information contained in each MOI are based on a network model or schema. As in prior art, the schema for the MIB 25 in FIG. 2 is fixed, i.e. the schema does not change. The MIB schema defines different object classes representing objects in the real network. One example of an object class is cells, i.e. radio network cells. Each class has attributes, which is data describing the class. Example of attributes are: Id, i.e. the identification of the class; Frequency, i.e. which frequency the class uses; Maximum power, i.e. maximum allowed power to use; etc.

According to embodiments of the present invention, a mechanism for modifying the schema at run time is provided and also interactions/operations that may be used by Managers 20 to change the schema definition are provided. The schema is changed when the manager thinks that there is a need to change it, e.g. due to the dimensions discussed below.

The modification of the schema is restrictive in the sense that the change is only to reduce the capability of the schema and, thus, making the MIB visible to managers smaller. As one example: the MIB schema defines a class of object to have 16 attributes. At run time, the MIB schema definition can be modified in that the class of the object will have 9 attributes, instead of the 16 attributes defined originally. This is obtained by disabling or removing attributes from the MOI class definition in the schema. Another example: the MIB schema defines 100 MOI classes. At run time, the MIB schema definition can be modified in that 7 of the 100 MOI classes would not be used. The modification may not be an expansion, such as, to add a new MOI class to the schema or to add a new attribute to an MOI class All MIB users (i.e. Managers 20) may not use all MIB information and therefore, the schema may be adjusted so that no maintenance is required for MIB information not required by MIB users. The schema modification is achieved along the following dimensions.

Time: The traffic volume of some part of the network is highly correlated to time of day. In such case, the MIB portion representing a certain network part will use a full schema for the 'busy' hours and reduced schema for the rest of the day so that, abnormality of network operation during busy hour is quicker to detect and diagnose.

Location: Some part of the network (e.g. a newly installed network segment) may require intensive monitoring while other parts, e.g. parts that are in-service for months and are fully operational according to plan, may require less intensive monitoring. In such case, the MIB portion representing the former part of the network would be the full schema definition and the MIB portion representing the latter part would be using a "reduced schema", i.e. a full schema applies to subnetwork-A while part of schema applies to subnetwork-B.

Class based: e.g.: disable use of attribute-1, attribute-6 of MSCFunction IOC; disable notification-7 and notification-2 from EUTRANFunction IOC. When modification is applied on "class based", then all instances of this class are modified.

Instance based: e.g.: disable use of all VsDataContainer attributes for certain MSCFunctions; disable counter-5, KPI-xyz generation from certain radio base stations. When modification is applied on "instance based", then the specific instance is modified.

Various combinations of the examples above.

The request to modify the schema is initiated by the manager 20, i.e. when the manager 20 thinks that it is necessary, e.g. due to the dimensions listed above.

According to an embodiment of the invention, all users of the managers of the MIB (e.g. operators, planners of a network operator) have an agreed plan on how to configure the MIB. If a Manager changes the MIB, the changed MIB will be serving all other Managers.

Figure 3:
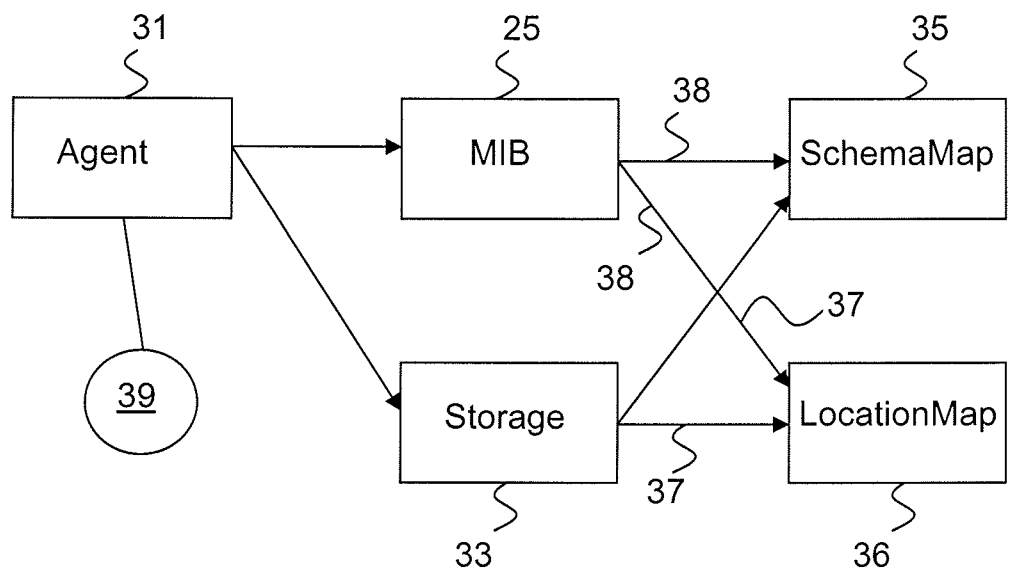
FIG. 3 is a class diagram according to the present invention.

FIG. 3 shows an example of major functional components of the invention. An Agent 31 is an entity that interfaces with various managers (not shown in FIG. 3) and offers the interface via which the managers and the agent 31 communicate. The Agent maintains two functional components, storage 33 and MIB 25.

The storage 33 holds all Maps designed/created by the Manager. There are two kinds of Maps contained in the storage 33, LocationMap 36 and SchemaMap 35.

A LocationMap 36, identified by an identifier mapID, is a holder of following information:
   mapID; this uniquely identifies this Map instances from all other Map instances inside the Storage 33.
   location; this is the Distinguished Name (DN) of the MOI of the MIB 25. The schema (the third attribute) relates to the subtree identified by this DN attribute.
   schema; this is the schema, collection of class definition and their relations applicable to the subtree identified by the DN of the $2^{nd}$ attribute.

A SchemaMap 35 is identical to the LocationMap 36 except that there is no location parameter. The Agent 31 holds this missing information, i.e. the location where the schema is applicable. The Agent 31 knows this missing information when it uses the SchemaMap 35 for a particular location in response to attachMap( ) described below.

The Agent 31 further maintains the Management Information Base (MIB) 25. As described above, the MIB 25 holds software instances (modules), each of which is a representation of the managed network resource. The one or multiple schemas used (and the 'used' relation is denoted by 38) by the MIB 25 at run time are stored (or contained) in the storage 33 in FIG. 3, denoted by 37.

The Agent 31 supports 6 operations via the interface 39:
1. queryMapStorage ( )
   This operation allows the Manager to ask for a listing of the current LocationMap(s) and SchemaMap(s) in Storage 33. The listing contains maps created by all Manager(s). The listing includes the status (e.g. if it is used/active at the moment).
   Input parameter 1: none
   Output parameter 1: list of LocationMap
   Ouput parameter 2: list of SchemaMap
2. createMapInStorage( )
   This operation allows the Manager to create a new LocationMap or SchemaMap.
   The Agent stores the newly created map in Storage.
   Input parameter 1: LocationMap or SchemaMap
   Output parameter 1: It has two legal values. Successful means the map is created. Failure means the map is not created. The failure reason is also provided.
3. deleteMapInStorage( )
   This operation allows the Manager to delete a map from Storage.
   Input parameter 1: list of LocationMap.mapID, list of SchemaMap.mapID.
   Output parameter 1: It has two legal values. Successful means all identified maps are removed or deleted from Storage. Failure means at least one identified maps is still in Storage. The failure reasons and the map(s) that are still in Storage are provided.
4. queryActiveMaps( )
   This operation allows the Manager to ask for a listing of identification of active maps. The operation response does not include the (definitions) the actual schema definition, just the identification of the map(s). The Agent returns the list of active LocationMap(s) and SchemaMap(s), i.e. have the 'use' 38 relation in FIG. 3. In the case of SchemaMap(s), the Agent also, for each SchemaMap identified, supply the location information where the said SchemaMap is being used/applied.
   Input parameter 1: none
   Output parameter 1: list of LocationMap.mapID(s) and list of {SchemaMap.mapID, location}.
5. activateMap( )
   This operation allows the Manager to activate a set of maps (LocationMap(s) and/or SchemaMap(s)). In the case of SchemaMap, the Manager would also supply the location information.
   Input parameter 1: locationMapList: This carries a set of mapID(s) (the identifier of the map).
   Input parameter 2: schemaMapList: This carries a set of {mapID, location}.
   Output parameter 1: It has two legal values. Successful means all operation is successful and that all maps are active. Failure means none of the maps supplied are active. The failure reason is also provided. There might be a "partly successful" scenario as well which would be a simpler and more 'fail safe' solution that assured NM, nothing has changed. NM can then try again. The server does not know the possible inter-dependency of members of MapList. So, it is 'not safe' for server to activate one and not the other (partly successful scenario).
6. deactivateMap( )
   This operation allows the Manager to deactivate active map(s).
   Input parameter 1: mapList: This carries a set of mapID(s).
   Output parameter 1: It has two legal values. Successful means the identified map is not active now regardless if it was active or not before the operation. Failure means the identified map is not known or the identified map was active and is still active. The failure reason is also provided.

Figure 4:
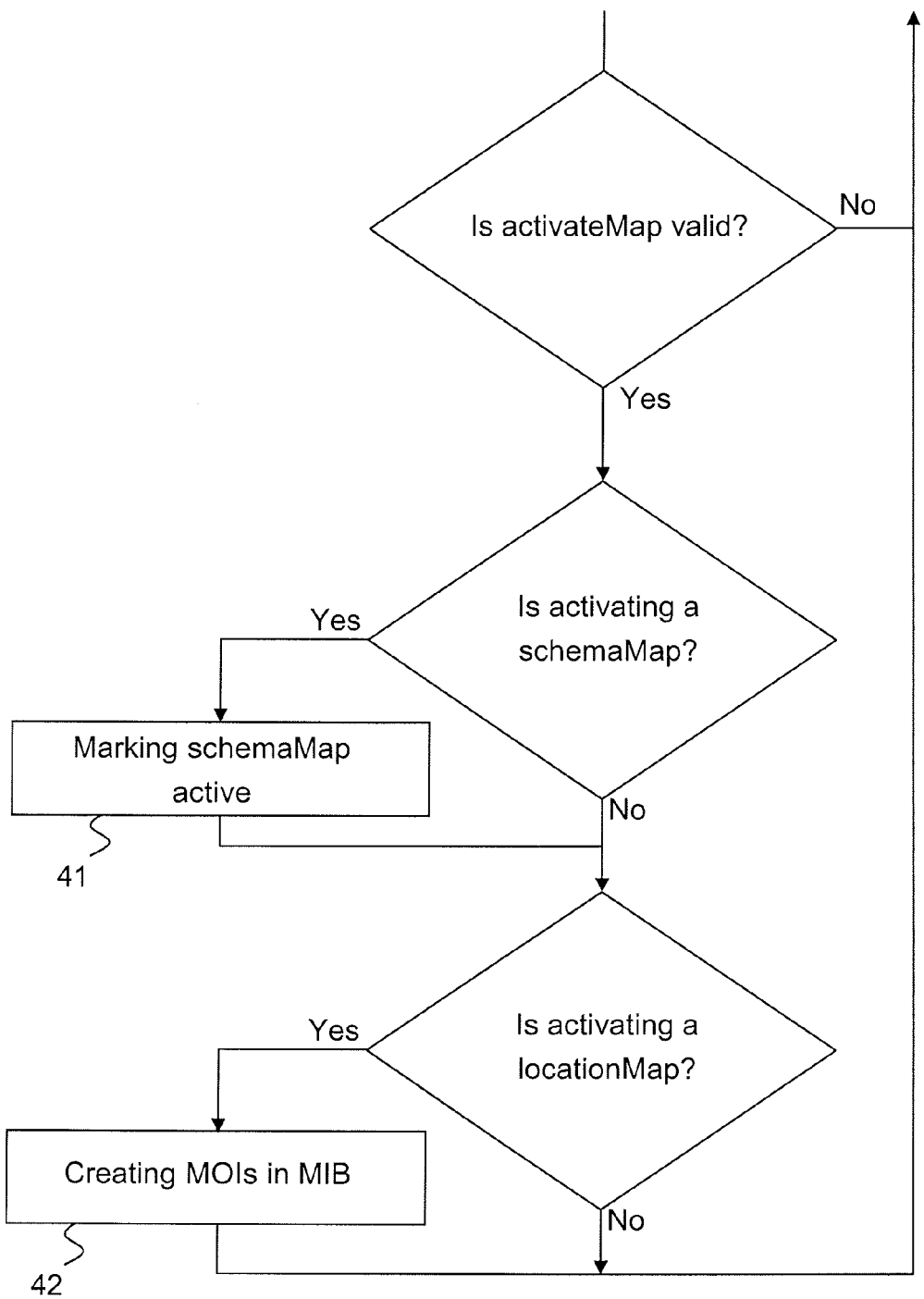
FIG. 4 is a flowchart showing the use of one operation provided for managers, which in this example is the use of activateMap( . . . )
Figure 5:
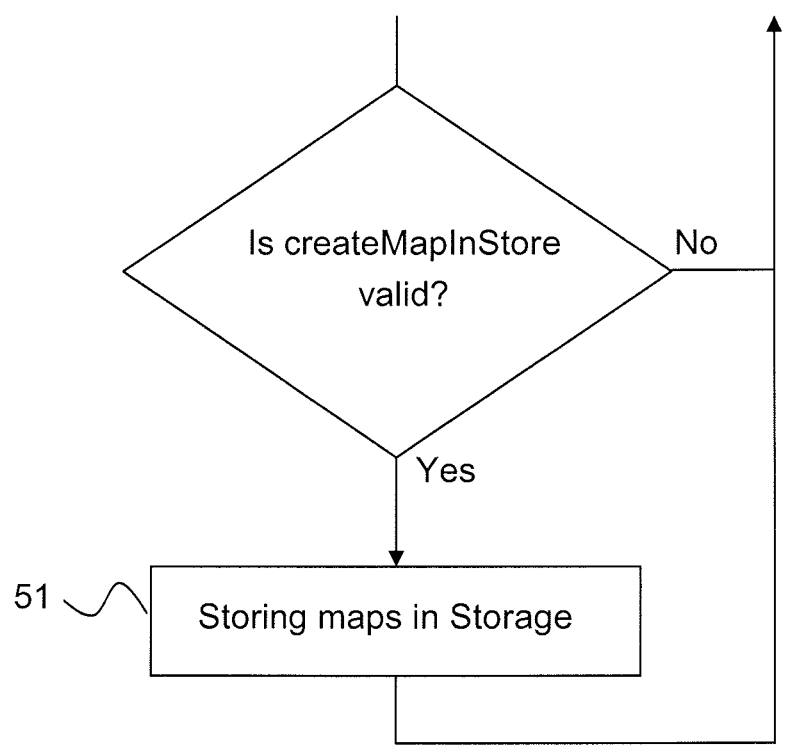
FIG. 5 shows another flowchart showing the use of one operation provided for managers, which in this example is the use of createMapInStorage( . . . )
Figure 6:
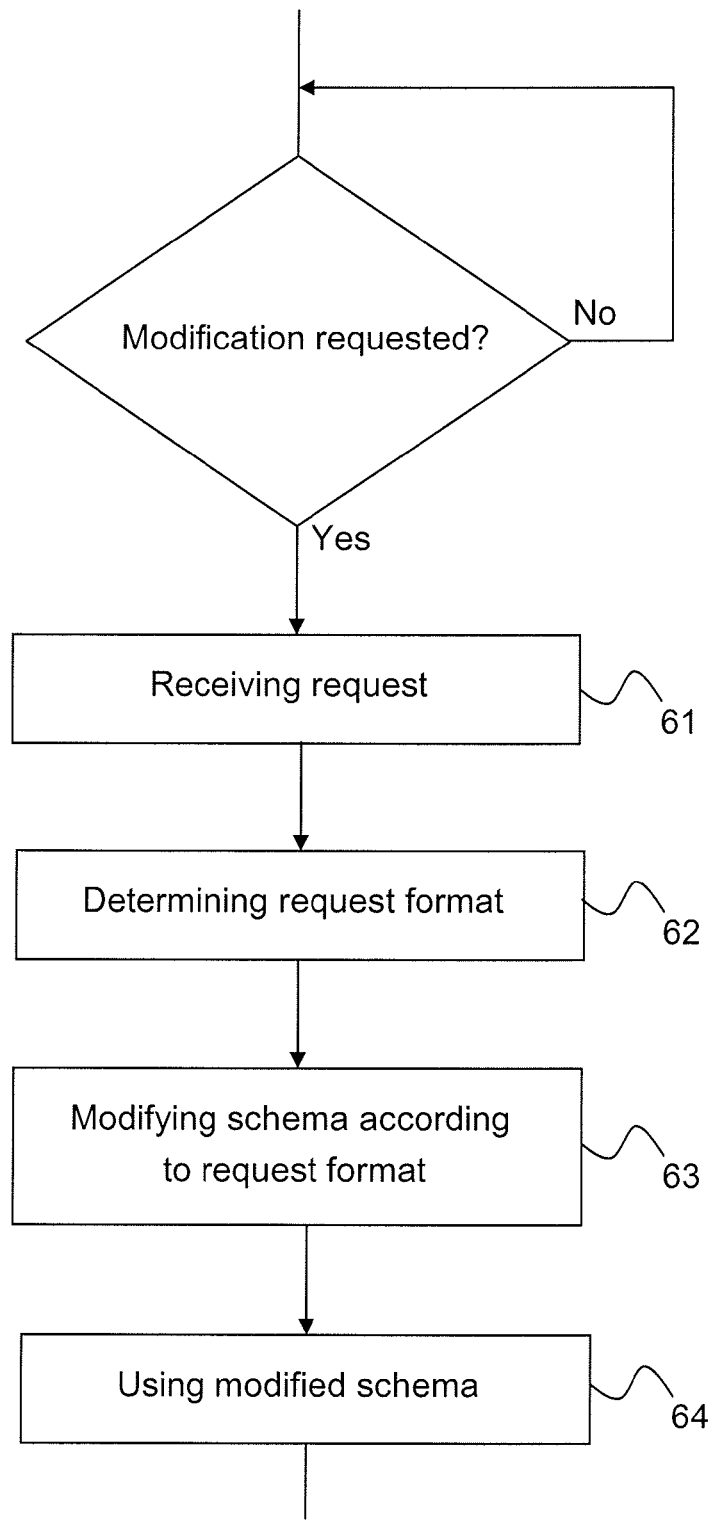
FIG. 6 is a flowchart of the inventive method according to one embodiment of the invention.

FIG. 4 shows an exemplifying flowchart of how the activateMap( . . . ) operation is used when the manager wants to activate a set of maps:
   If the activateMap is valid (or maps are in storage) and activating is a schemaMap, marking the schemaMap as active (step 41);
   Then, if activating is a locationMap, creating the necessary MOIs in the MIB (step 42);

Further, if the activateMap is valid (or maps are in storage), activating is not a schemaMap but is a locationMap, creating the necessary MOIs in the MIB (step 42), FIG. 5 shows another example of a flowchart of how the createMapInStorage( . . . ) (queryMap) operation is used when the manager wants to create a new LocationMap or SchemaMap:

If createMapInStorage is valid, storing maps in Storage (step 51);

According to an embodiment of the present invention, the procedure for facilitating communication network system management in which a network management architecture comprises modules representing a virtual reality of network nodes and network links under management, wherein organization of said modules and information contained in said modules are based on a pre-determined network management schema, whereby said network nodes and said network links are managed by accessing and manipulating said modules, as shown in FIG. 6, is as follows:

receiving a request to modify the network management schema (step 61). The request is initiated by the manager;

determining the request format (step 62), i.e. possible operations (supported by the agent) and its attributes;

modifying the schema based on the received format (step 63), i.e. reducing the size of the MIB by e.g. disable some attributes;

using the modified schema for network management (step 64).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of facilitating communication network system management in which a virtual network management architecture comprises a virtual reality of modules representing physical network nodes and physical network links of a physical communications network system under management, wherein organization of said virtual modules and information contained in said virtual modules are based on a network management schema representing the physical communications network, the method comprising:

managing said physical network nodes and said physical network links of the physical communications network by accessing and manipulating said virtual modules;

providing an interface through which said network management schema is modified, wherein said interface comprises a storage function containing created locationMaps and schemaMaps, and wherein a locationMap comprises a unique map identifier, a location indicated by a distinguished name of a managed object instance (MOI) representing a module in a management information base (MIB) and schema comprising class definitions corresponding to the distinguished name, and wherein a schemaMap comprises a unique map identifier and schema comprising class definitions corresponding to the distinguished name, and wherein said interface supports asking for a list of locationMaps and schemaMaps, or creating a new locationMap or schemaMap;

modifying said network management schema by reducing the amount of information in said virtual modules; and using said modified network management schema to manage said physical communication network system.

2. A method according to claim 1 wherein said network management schema is modified dependent on what time of day it is.

3. A method according to claim 1 wherein said network management schema is modified dependent on a location of said physical network nodes to be managed within said physical communication network system.

4. A method according to claim 1 wherein a same type of virtual modules are represented by an object class defined by said network management schema wherein each said network management schema is modified dependent on object class.

5. A method according to claim 1 wherein said network management schema is modified to disable or remove attributes dependent on each of said virtual modules.

6. A method according to claim 1 wherein said interface comprises a management information base holding said virtual modules.

7. An arrangement for facilitating communication network system management in which a virtual network management architecture comprises virtual modules representing physical network nodes and physical network links of a physical communications network system under management, wherein organization of said virtual modules and information contained in said virtual modules are based on a network management schema representing the physical communications network, whereby said physical network nodes and said physical network links are managed by accessing and manipulating said virtual modules, the arrangement comprising:

an interface configured to modify said network management schema by reducing the amount of information in said virtual modules, wherein said interface comprises a storage function containing created locationMaps and schemaMaps, and wherein a locationMap comprises a unique map identifier, a location indicated by a distinguished name of a managed object instance (MOI) representing a module in a management information base (MIB) and schema comprising class definitions corresponding to the distinguished name, and wherein a schemaMap comprises a unique map identifier and schema comprising class definitions corresponding to the distinguished name, and wherein said interface is arranged to support asking for a list of locationMaps and schemaMaps, or creating a new locationMap or schemaMap; and a domain manager configured to use said modified network management schema to manage said physical communication network system.

8. An arrangement according to claim 7 wherein said network management schema is arranged to be modified dependent on what time of day it is.

9. An arrangement according to claim 7 wherein said network management schema is arranged to be modified dependent on a location of said physical network nodes to be managed within said physical communication network system.

10. An arrangement according to claim 7 wherein a same type of virtual modules are represented by an object class defined by said network management schema wherein each said network management schema is arranged to be modified dependent on object class.

11. An arrangement according to claim 7 wherein said network management schema is arranged to be modified to disable or remove attributes dependent on each of said virtual modules.

12. An arrangement according to claim 7 wherein said interface comprises a management information base holding said virtual modules.

13. A method according to claim 1 wherein the reducing comprises reducing the amount of information in said virtual modules during run time of said physical network nodes and said physical network links of said physical communications network, system while managing said physical network nodes and said physical network links by accessing and manipulating said virtual modules.

14. An arrangement according to claim 7 wherein the interface is configured to reduce the amount of information in said virtual modules during run time of said physical network nodes and said physical network links of said physical communications network system while managing said physical network nodes and said physical network links by accessing and manipulating said virtual modules.

15. A method according to claim 1 wherein modifying said network management schema further comprises disabling or removing attributes defined for an object class of said network management schema.

16. A method according to claim 15 wherein an object class comprises radio network cells.

17. A method according to claim 1 wherein said network management schema is arranged to be modified such that a reduced schema is used for a newer portion of said virtual network management architecture.

18. A method according to claim 2 wherein said network management schema is arranged to be modified such that a reduced schema is used for a time of a day that has less traffic volume than other times of the day.

\* \* \* \* \*

UNITED STATES PATENT AND TRADEMARK OFFICE
CERTIFICATE OF CORRECTION

PATENT NO.        : 8,719,394 B2                                    Page 1 of 1
APPLICATION NO.   : 13/000967
DATED             : May 6, 2014
INVENTOR(S)       : Petersen et al.

It is certified that error appears in the above-identified patent and that said Letters Patent is hereby corrected as shown below:

In the Specification

Column 5, Line 41, delete "attachMap( )" and insert -- attachMap( ), --, therefor.

In the Claims

Column 10, Line 3, in Claim 13, delete "network, system" and insert -- network system --, therefor.

Signed and Sealed this
Fourth Day of November, 2014

Michelle K. Lee
*Deputy Director of the United States Patent and Trademark Office*